F. H. FRISSELL.
REEL FOR VENDING ELASTIC WEBBING.
APPLICATION FILED JUNE 3, 1912.
1,037,465.
Patented Sept. 3, 1912.
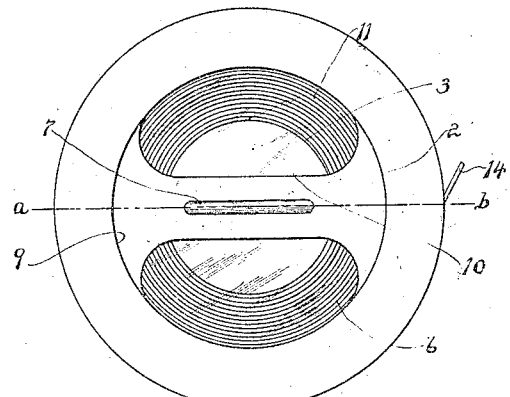
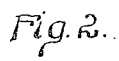
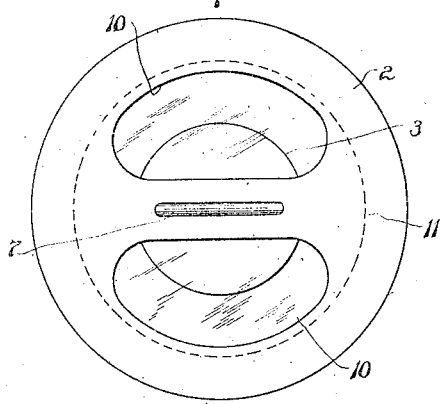
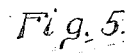
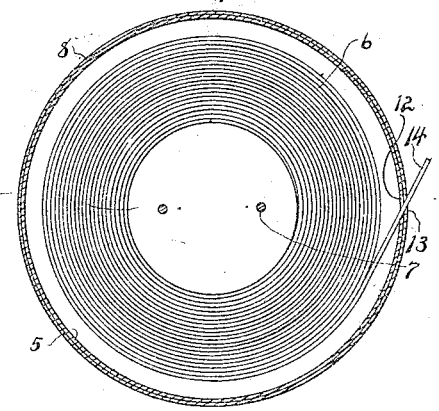
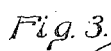
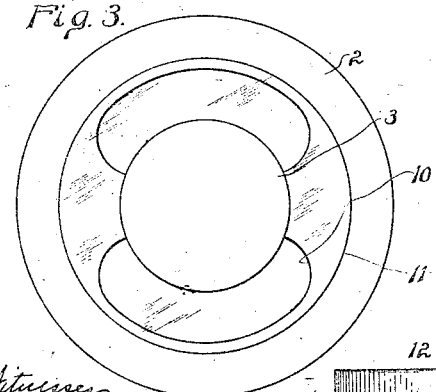
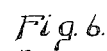
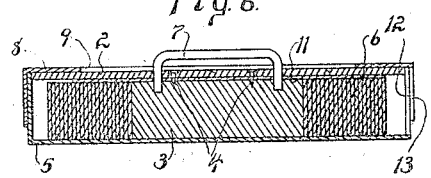
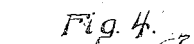

UNITED STATES PATENT OFFICE.

FRANK H. FRISSELL, OF MIDDLETOWN, CONNECTICUT, ASSIGNOR TO THE RUSSELL MANUFACTURING CO., OF MIDDLETOWN, CONNECTICUT, A CORPORATION.

REEL FOR VENDING ELASTIC WEBBING.

1,037,465.  Specification of Letters Patent.  Patented Sept. 3, 1912.

Application filed June 3, 1912. Serial No. 701,369.

*To all whom it may concern:*

Be it known that I, FRANK H. FRISSELL, a citizen of the United States, residing at Middletown, in the county of Middlesex and State of Connecticut, have invented a new and useful Improvement in Reels for Vending Elastic Webbing; and I do hereby declare the following, when taken in connection with the accompanying drawings and the characters of reference marked thereon, to be a full, clear, and exact description of the same, and which said drawings constitute part of this application, and represent, in—

Figure 1 a plan view of a vending reel constructed in accordance with my invention. Fig. 2 a detached view of the rotary core of the device together with its skeletonized centering-disk and handle. Fig. 3 a reverse view thereof. Fig. 4 an edge view of the reel. Fig. 5 a view thereof in horizontal section. Fig. 6 a view of the reel in transverse section on the line $a$—$b$ of Fig. 1.

My invention relates to an improved reel for vending elastic webbing, ribbon and braid, the object being to provide a simple, cheap and convenient reel for confining and protecting webbing, ribbon, braid, etc., so as to enable the retailer to keep the articles from being mussed or soiled until the last yard is sold.

With these ends in view my invention consists in a vending reel having certain details of construction and combinations of parts as will be hereinafter described and particularly recited in the claims.

In carrying out my invention as herein shown, I employ a skeletonized centering-disk 2 made of heavy pasteboard or equivalent material and secured to a wooden core or spool 3 so as to be concentric therewith, in any convenient manner such as by small tacks 4 driven thereinto. The said centering-disk 2 corresponds in external diameter to the internal diameter of a circular paper-box 5 within the edge of which it fits so as to ride thereupon as shown in Fig. 6, whereby the core 3 is always maintained properly centered within the box. The said core 3 corresponds in width to the depth of the box which conforms to the width of the webbing, ribbon or braid 6 which it is designed to wind upon the core. A staple-like wire handle 7 has its ends driven into the core 3 and provides for rotating the same as required for winding the webbing, ribbon or braid thereupon. The said box 5 is furnished with a circular paper cover 8 the flange of which, as shown, is nearly, but not quite as wide as the box is deep. This cover is formed with a large concentric, circular opening 9 for the partial exposure of the contents of the reel through sight-openings 10 formed in the centering-disk 2 on opposite sides of the center thereof, these openings 10 being large enough to expose a portion of the core 3 and the inner coils of the webbing, ribbon or braid 6, so that the character and color thereof may be determined at a glance, as well as substantially the amount thereof left in the reel at any given time.

To protect the webbing, ribbon or braid from being soiled in handling the reel as well as to exclude dust and dirt from the reel, I place a transparent disk 11 of celluloid or equivalent material between the core 3 and the skeletonized centering-disk 2 so as to be held in place by the tacks 4, the said disk 11 being large enough to extend beyond the outer edges of the sight-openings 10 in the said centering-disk 2. Alined slots 12 and 13 formed in the flanges of the box 5 and cover 8 provide for the egress of the outer end 14 of the coil of webbing, ribbon or braid upon the said core 3.

I claim:—

1. In a vending reel for webbing, ribbon, braid, etc., the combination with a box, of a cover therefor provided with an opening, a core located within the said box and provided with a handle, a centering-disk secured to the said core and centering the same in the box, and formed with one or more sight-openings, and a sheet of transparent material applied to the said disk for protecting the contents of the reel and excluding the dust therefrom.

2. In a vending reel for webbing, ribbon, braid, etc., the combination with a box, of a cover therefor provided with a sight-opening, a core located within the said box, a centering-disk secured to the said core and centering the same within the box and formed with one or more sight-openings, a sheet of transparent material extending over the said sight opening or openings to exclude dust from the box, and a handle entering the box through the said opening in the cover and providing for rotating the core.

In testimony whereof, I have signed this specification in the presence of two subscribing witnesses.

FRANK H. FRISSELL.

Witnesses:
SCHUYLER J. TAYLOR,
RICHARD C. FAGAN.